United States Patent
Hayashi

(10) Patent No.: US 9,469,217 B2
(45) Date of Patent: Oct. 18, 2016

(54) VEHICLE SEAT

(71) Applicants: TOYOTA BOSHOKU KABUSHIKI KAISHA, Aichi-ken (JP); AISIN SEIKI KABUSHIKI KAISHA, Aichi-ken (JP); SHIROKI CORPORATION, Kanagawa (JP)

(72) Inventor: Naoki Hayashi, Toyokawa (JP)

(73) Assignees: TOYOTA BOSHOKU KABUSHIKI KAISHA, Aichi-Ken (JP); AISIN SEIKI KABUSHIKI KAISHA, Aichi-Ken (JP); SHIROKI CORPORATION, Kanagawa (JP)

( * ) Notice: Subject to any disclaimer, the term of this patent is extended or adjusted under 35 U.S.C. 154(b) by 0 days.

(21) Appl. No.: 14/494,074

(22) Filed: Sep. 23, 2014

(65) Prior Publication Data
US 2015/0090854 A1   Apr. 2, 2015

(30) Foreign Application Priority Data
Sep. 30, 2013   (JP) ................... 2013-203573

(51) Int. Cl.
*B60N 2/07* (2006.01)
*B60N 2/08* (2006.01)

(52) U.S. Cl.
CPC ............ *B60N 2/0705* (2013.01); *B60N 2/073* (2013.01); *B60N 2/0715* (2013.01); *B60N 2/0725* (2013.01); *B60N 2/0727* (2013.01);
(Continued)

(58) Field of Classification Search
CPC .. B60N 2/0705; B60N 2/0725; B60N 2/073; B60N 2/08; B60N 2/0812; B60N 2/0818; B60N 2/0837; B60N 2/0856; B60N 2/0862; B60N 2/0875; B60N 2/0881; B60N 2/0887

USPC ............. 248/424, 429, 430, 419, 420; 296/65.13–65.15; 297/344.1, 344.11
See application file for complete search history.

(56) References Cited

U.S. PATENT DOCUMENTS 3,013,849 A * 12/1961 Peddie ........................ 384/18
6,676,099 B2 * 1/2004 Mallard et al. ............. 248/429
(Continued)

FOREIGN PATENT DOCUMENTS

CN   101519046   9/2009
CN   101722869   6/2010
(Continued)

OTHER PUBLICATIONS

U.S. Appl. No. 14/492,767 to Yuji Arakawa, filed Sep. 22, 2014.
(Continued)

*Primary Examiner* — Jonathan Liu
*Assistant Examiner* — Guang H Guan
(74) *Attorney, Agent, or Firm* — Greenblum & Bernstein, P.L.C.

(57) ABSTRACT

A vehicle seat includes a slide rail that has a lower rail and an upper rail, and a cap that is provided on an end portion in a longitudinal direction of at least one of the lower rail and the upper rail. A base portion that is adjacent to and follows an end surface shape of the end portion in the longitudinal direction of the lower rail or the upper rail on which the cap is provided, and a filler portion that extends from the base portion toward the center in the longitudinal direction of the lower rail or the upper rail on which the cap is provided, and that fills a space in a separating direction of the lower rail and the upper rail, are provided on the cap.

5 Claims, 8 Drawing Sheets

(52) U.S. Cl.
CPC ............... *B60N2/0732* (2013.01); *B60N 2/08* (2013.01); *B60N 2/0818* (2013.01); *B60N 2/0875* (2013.01); *B60N 2/0881* (2013.01)

(56) References Cited

U.S. PATENT DOCUMENTS

| | | | |
|---|---|---|---|
| 6,820,851 B2* | 11/2004 | Mochizuki ............ | B60N 2/067 248/429 |
| 7,814,637 B2* | 10/2010 | Terada ................. | B60N 2/0224 174/113 R |
| 7,992,834 B2* | 8/2011 | Kojima et al. ................ | 248/429 |
| 8,474,777 B2* | 7/2013 | Nihonmatsu et al. ........ | 248/429 |
| 8,925,889 B2* | 1/2015 | Nagura et al. ................ | 248/429 |
| 2005/0145768 A1* | 7/2005 | Rohee .................... | B60N 2/073 248/430 |
| 2009/0218843 A1* | 9/2009 | Wojatzki et al. .......... | 296/65.13 |
| 2012/0256074 A1* | 10/2012 | Garotte ......................... | 248/429 |
| 2015/0090853 A1* | 4/2015 | Arakawa ............. | B60N 2/0705 248/429 |
| 2015/0090854 A1* | 4/2015 | Hayashi ............... | B60N 2/0705 248/429 |
| 2015/0090855 A1* | 4/2015 | Arakawa .................. | B60N 2/07 248/429 |

FOREIGN PATENT DOCUMENTS

| | | | | |
|---|---|---|---|---|
| EP | 2174827 | 4/2014 | | |
| JP | 6-179337 | 6/1994 | | |
| JP | 2005-82130 | 3/2005 | | |
| JP | 2009-262733 | 11/2009 | | |
| JP | WO 2013035414 A1 * | 3/2013 | ........... | B60N 2/0705 |
| WO | 2012/081354 | 6/2012 | | |

OTHER PUBLICATIONS

Official Action, including English-language translation thereof, for DE 10 2014 219 233.1 having a mailing date of Sep. 15, 2015.
Official Action, with English-language translation thereof, for CN Appl. No. 201410505437.0 dated Apr. 5, 2016.

* cited by examiner

FIG.5
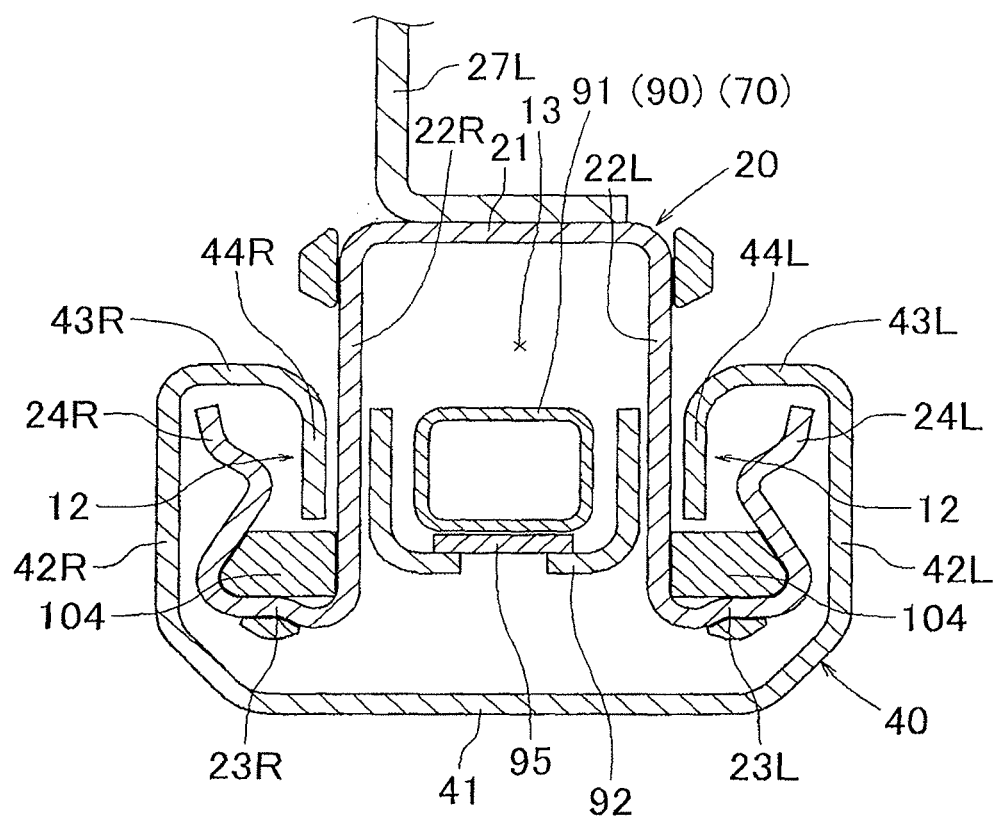
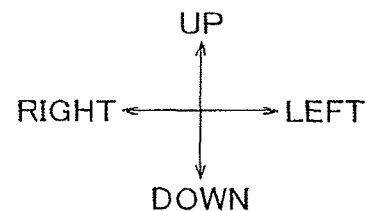

VEHICLE SEAT

INCORPORATION BY REFERENCE

The disclosure of Japanese Patent Application No. 2013-203573 filed on Sep. 30, 2013 including the specification, drawings and abstract is incorporated herein by reference in its entirety.

BACKGROUND OF THE INVENTION

1. Field of the Invention

The invention relates to a vehicle seat.

2. Description of Related Art

Japanese Patent Application Publication No. 6-179337 (JP 6-179337 A), for example, describes a vehicle seat having a slide rail that has a lower rail arranged on a vehicle structural member side such as a floor surface of a vehicle, and an upper rail that is arranged on a seat main body side and is slidably supported on the lower rail, and a cap provided on an end portion, in a longitudinal direction, of at least one of the lower rail and the upper rail of the slide rail. JP 6-179337 A describes a structure in which the cap covered by a rail end portion and is fixed by a nut and bolt. As a result, the cap protects the rail end portion. When a large load is exerted on the slide rail as a result of a vehicle collision or the like, the lower rail and the upper rail may deform from their original shapes due to this large load being exerted in a direction in which the lower rail and the upper rail separate from each other. In particular, of the deformation of the slide rail, deformation near the end portions in the longitudinal direction of the lower rail and the upper rail is significant. Therefore, various measures are desired in order to inhibit the slide rail from deforming.

SUMMARY OF THE INVENTION

However, the cap described in JP 6-179337 A is designed to protect the rail end portion, not to inhibit the rail from deforming. There is a space between the lower rail and the upper rail to inhibit interference between the two so that they can slide. However, if this space is set large, a large load such as that described above will be exerted in the separating direction of the lower rail and the upper rail and rattling of the two members becomes pronounced, and they tend to deform. In particular, deformation near the end portions of the lower rail and the upper rail in the longitudinal direction is significant, so it is desirable to improve the rigidity of the end portions of the lower rail and the upper rail.

The invention thus provides a vehicle seat capable of both protecting, and inhibiting deformation of, a rail end portion of a lower rail or an upper rail.

A first aspect of the invention relates to a vehicle seat that includes a slide rail that has a lower rail arranged on a vehicle structure member side, and an upper rail that is arranged on a seat main body side and is slidably supported on the lower rail; and a cap that is provided on an end portion in a longitudinal direction of at least one of the lower rail and the upper rail. An engaging portion that inhibits separation between the lower rail and the upper rail is formed by one of the lower rail and the upper rail being inserted into and arranged inside the other, and a tip end portion of the lower rail overlapping with a tip end portion of the upper rail. A base portion that is adjacent to and follows an end surface shape of the end portion in the longitudinal direction of the lower rail or the upper rail on which the cap is provided, and a filler portion that extends from the base portion toward the center in the longitudinal direction of the lower rail or the upper rail on which the cap is provided, and that fills a space in a separating direction of the lower rail and the upper rail in the engaging portion, are provided on the cap.

According to this aspect, the cap has a base portion that is adjacent to, and following substantially the same shape as the end surface shape of, the end portion in the longitudinal direction of the lower rail or the upper rail on which the cap is provided. Therefore, the base portion of the cap is able to protect the end portion of the lower rail or the upper rail. Also, the cap has a filler portion that extends from the base portion toward the center in the longitudinal direction of the lower rail or the upper rail on which the cap is provided, and that fills in the space in the separating direction of the lower rail and the upper rail in the engaging portion. As a result, the filler portion of the cap is able to inhibit rattling of both members when a large load is exerted in a direction in which the lower rail and the upper rail separate from each other following a vehicle collision or the like, and thus enables the rigidity of the rail to be improved. This improvement in the rail rigidity makes it possible to inhibit deformation of the end portions of the lower rail and the upper rail. Accordingly, it is possible to both protect, and inhibit the deformation of, the rail end portion of the lower rail or the upper rail.

In the aspect described above, the lower rail and the upper rail may both have a flat surface portion having a flat plate shape that is substantially parallel to and faces the vehicle structure member, and a pair of side surface portions that extend from both ends in a width direction of the flat surface portion in a direction intersecting the flat surface portion. One of the lower rail and the upper rail may have a pair of inside tip end portions that are bent in and extend toward an inside from an end portion of each of the pair of side surface portions. The other of the lower rail and the upper rail may have a pair of outside tip end portions that are bent back and extend toward an outside from the end portion of each of the side surface portions, and the filler portion may be provided in a space corresponding to the pair of inside tip end portions, of the space in the separating direction of the lower rail and the upper rail in the engaging portion.

According to this structure, the filler portion is provided in the space corresponding to the pair of inside tip end portions, of the space in the separating direction of the lower rail and the upper rail in the engaging portion. This is because rattling of both members when a large load is exerted in a direction in which the lower rail and the upper rail separate from each other following a vehicle collision or the like, may become pronounced at the pair of inside tip end portions described above. Therefore, it is possible to both further inhibit the deformation, and further improve the rigidity, of the end portions of the lower rail and the upper rail by providing the filler portion at this portion.

In the aspect described above, the cap may have a pawl portion that is attached to at least one of flat surface portions having a flat plate shape that is substantially parallel to and faces the vehicle structure member, of the lower rail and the upper rail, or side surface portions that extend from both ends in a width direction of the flat surface portions, in a direction intersecting the flat surface portions by engaging with a hole formed in at least one of flat surface portions having a flat plate shape that is substantially parallel to and faces the vehicle structure member, of the lower rail and the upper rail, or side surface portions that extend from both ends in a width direction of the flat surface portions, in a direction intersecting the flat surface portions.

According to this structure, the cap is attached to the lower rail or the upper rail by engaging with a pawl portion.

The cap does not have to be fixed (i.e., attached) by a fastening member or the like. Therefore, the cap is able to both reduce the number of component parts, and improve the attaching workability.

In the structure described above, the pawl portion may engage with the hole from the outside.

According to this structure, the pawl portion for attaching the cap is configured to engage with the hole formed in at least one of the side surface portions or the flat surface portions of the lower rail and the upper rail from the outside, so interference with the sliding movement of the lower rail and the upper rail is able to be inhibited.

The vehicle seat in the aspect described above may also include a slide locking mechanism that restricts sliding movement of the upper rail with respect to the lower rail at an appropriate position. The slide locking mechanism may have a locking member that places the upper rail in a slide-locked state by restricting the sliding movement of the upper rail at an appropriate position, and an operating member that transmits an unlocking force for releasing the upper rail from the slide-locked state established by the locking member, to the locking member. The locking member may be arranged between the flat surface portion of the lower rail that has a flat plate shape that is substantially parallel to and faces the vehicle structure member, and the flat surface portion of the upper rail that has a flat plate shape that is substantially parallel to and faces the vehicle structure member. The operating member may be configured to engage with the locking member by entering between the lower rail and the upper rail from an end portion in the longitudinal direction of the lower rail and the upper rail, and an open portion that allows the operating member to enter between the lower rail and the upper rail may be formed in the base portion of the cap.

According to this structure, the lock member is arranged in the space formed between the flat surface portion of the lower rail and the flat surface portion of the upper rail, and the operating member is configured to enter between the lower rail and the upper rail from the end portion in the longitudinal direction of the lower rail and the upper rail and engage with the lock member. In this way, the space around the slide rail is able to be used effectively by having the slide locking mechanism be arranged inside the slide rail. However, with this kind of structure, there is a possibility that the operating member may interfere with the cap because the operating member enters between the lower rail and the upper rail from the end portion in the longitudinal direction of the slide rail. However, the base portion of the cap has the open portion that allows the operating member to enter between the lower rail and the upper rail. Therefore, by providing the open portion on the base portion of the cap, the rail end portion of the lower rail or the upper rail is able to be both protected and inhibited from deforming, even with a structure in which the operating member that operates the locking member arranged inside the slide rail enters between the lower rail and the upper rail from the end portion in the longitudinal direction of the slide rail.

The aspects described above make it possible to both protect, and inhibit deformation of, a rail end portion of a lower rail or an upper rail.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 5 is a sectional view taken along line V-V in FIG. 4;

DETAILED DESCRIPTION OF EMBODIMENTS

Figure 1:
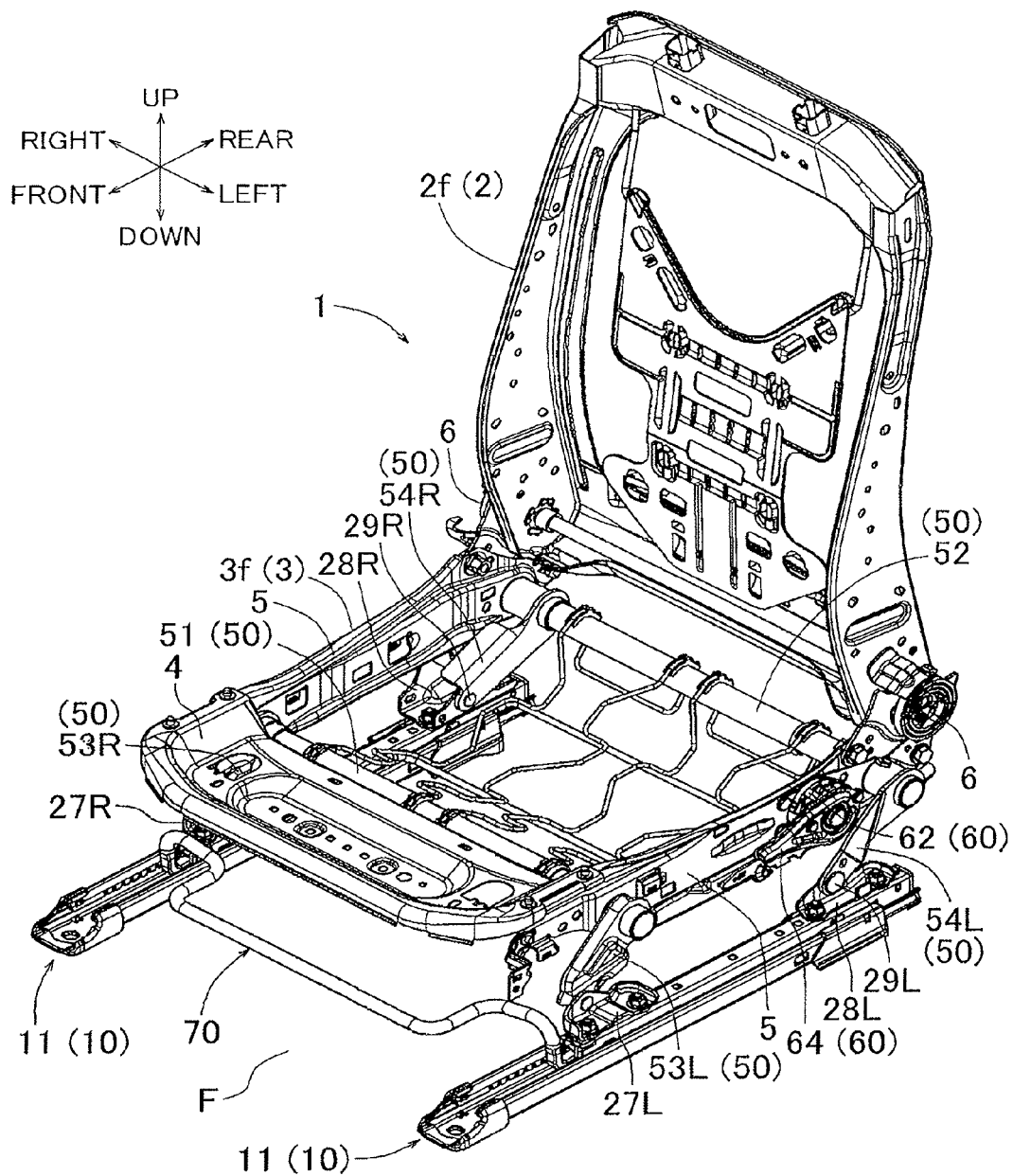
FIG. 1 is an overall perspective view of a vehicle seat according to an example embodiment of the invention.

Hereinafter, an example embodiment of the vehicle seat of the invention will be described with reference to FIGS. 1 to 9. In this example embodiment, the vehicle seat described is a front seat for an automobile (i.e., a vehicle). Directions indicated by the arrows in the drawings are directions matching the front, rear, upper, lower, right, and left when viewed by a seated occupant that is seated in the vehicle seat that is applied to a vehicle and is arranged facing toward the front of the vehicle. The drawings show mainly the internal structure of a seat main body in order to facilitate understanding of the structure of the example embodiment. Therefore, mainly the framework structure of the insides of a back frame 2f and a cushion frame 3f and the like that make up the frame of a seatback 2 and a seat cushion 3 are shown. Trim such as a seat pad and a cover fitted over the outside and the like may be omitted from the description and the drawings.

The vehicle seat includes a seat main body 1 that has a seatback 2 that serves as a backrest portion, and a seat cushion 3 that serves as a seating portion, as its main components, as shown in FIG. 1. The seatback 2 has a back frame 2f that forms a frame (a headrest is not shown and will not be described). The back frame 2f is formed in a generally rectangular frame shape by appropriately bending and drawing (or raising), for example, pipe members and plate members made of ferrous material. The seat cushion 3 has a cushion frame 3f that forms a frame. Similarly, the cushion frame 3f is also formed in a generally rectangular frame shape by appropriately bending and drawing (or raising), for example, pipe members and plate members made of ferrous material. The seat main body 1 is connected to the cushion frame 3f by a reclining device 6 provided on a lower portion in the width direction of the back frame 2f. As a result, the seatback 2 is a structure that adjusts the backrest angle with respect to the seat cushion 3, and is able to tilt forward on the seat cushion 3.

The cushion frame 3f is formed in a generally rectangular frame shape and includes a front frame 4, lower arms 5, a front rod 51, and a rear rod 52 as its main components, as shown in FIG. 1. The lower arms 5 are each formed by appropriately bending a strip-like plate member. The lower arms 5 are arranged on both sides (i.e., one on each side) in the width direction of the cushion frame 3ƒ with the longitudinal direction thereof extending in a vehicle longitudinal direction, above a slide rail device 10 that will be described later. The front frame 4 is arranged extending between front ends of the lower arms 5, and forms a front end of the cushion frame 3ƒ. The front rod 51 that is made of a pipe member of ferrous material extends between and passes through the lower arms 5 in the width direction, on the front side of the lower arms 5. Similarly, the rear rod 52 that is made of a pipe member of ferrous material extends between and passes through the lower arms 5 in the width direction toward the rear of the lower arms 5. The front rod 51 and the rear rod 52 are able to rotate with respect to the lower arms 5.

The vehicle seat has a slide rail device 10 that makes it possible to adjust a seating position of the seat main body 1 in the vehicle longitudinal direction with respect to a floor surface F (a vehicle structure member) of the vehicle, provided between the seat main body 1 described above and the floor surface F, as shown in FIGS. 1 and 2. The slide rail device 10 has slide rails 11 and a slide locking mechanism 70, as shown in FIG. 1. The slide rails 11 are arranged parallel in a matched (i.e., left and right) pair pointed in the vehicle longitudinal direction between the seat cushion 3 and the floor surface F.

Figure 2:
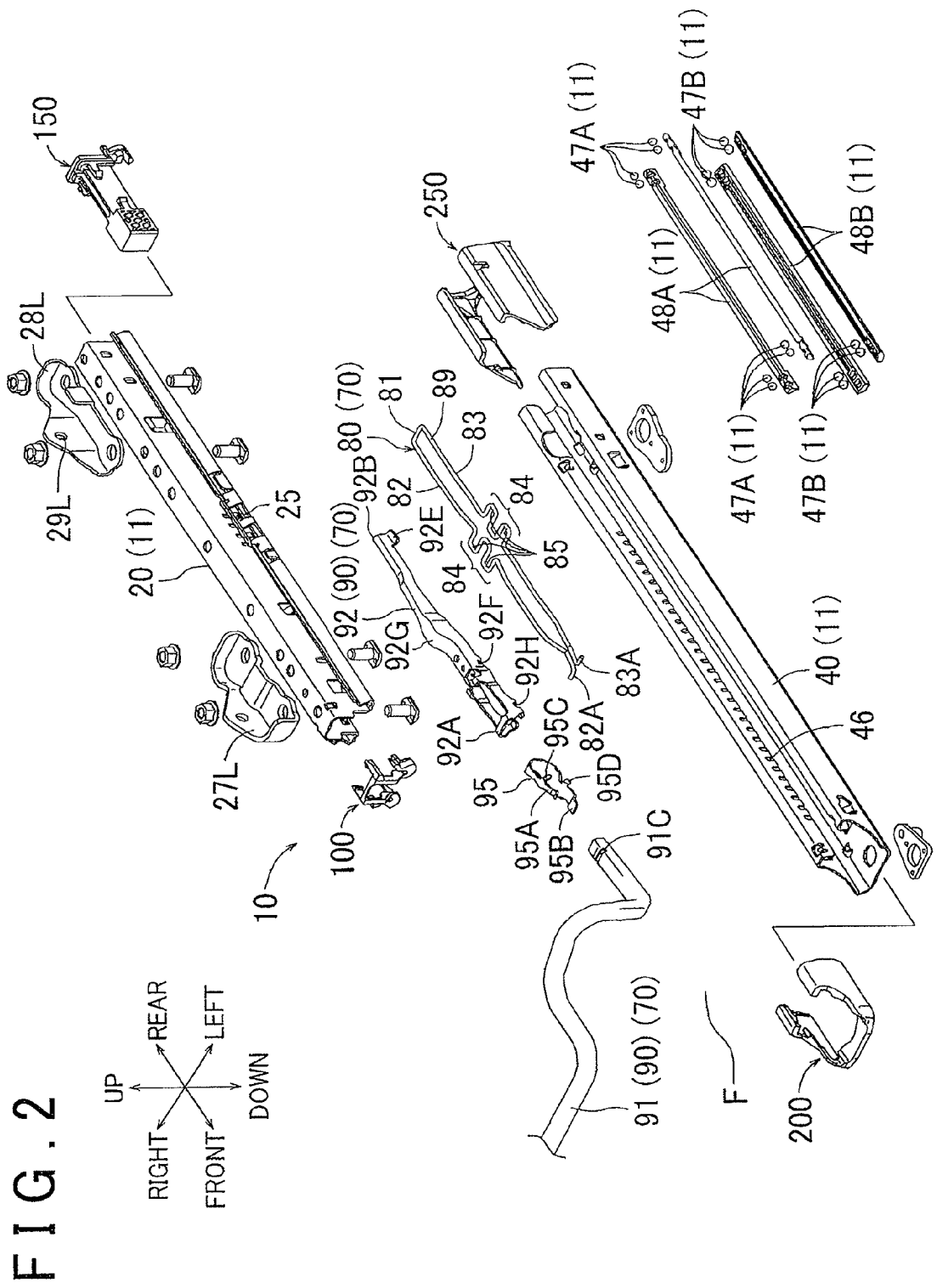
FIG. 2 is an exploded perspective view of a slide rail device of the vehicle seat according to the example embodiment of the invention.

The slide rails 11 are arranged between the seat main body 1 and the floor surface F of the vehicle, as shown in FIG. 1, and are mechanisms for moving the seating position of the seat main body 1 with respect to the floor surface F in the vehicle longitudinal direction. Each slide rail 11 is mainly formed by a lower rail 40, an upper rail 20, moving bodies 47A and 47B, and guides 48A and 48B, as shown in FIG. 2. The lower rail 40 is formed in a shape that extends in the vehicle longitudinal direction, and is arranged on the floor surface F. The upper rail 20 is arranged on the seat main body 1 side (see FIG. 1), and is fitted into the lower rail 40 so as to be able to slide in the rail longitudinal direction with respect to the lower rail 40. More specifically, the lower rail 40 and the upper rail 20 are formed in a cylindrical shape by being overlapped with each other via the moving bodies 47A and 47B and the guides 48A and 48B. As a result, the upper rail 20 moves the seating position of the seat main body 1 in the vehicle longitudinal direction as it is slidably guided in the vehicle longitudinal direction with respect to the lower rail 40.

Figure 3:
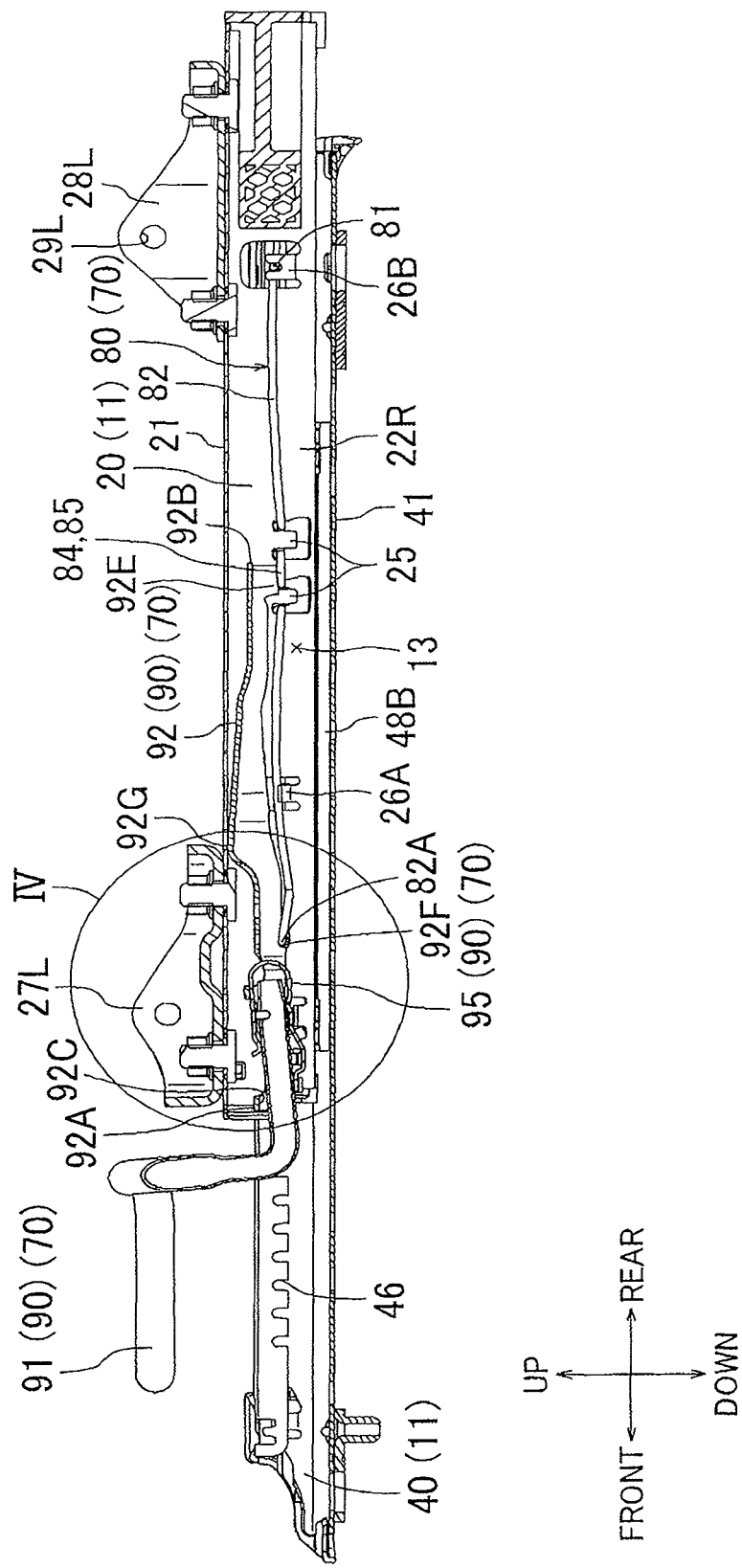
FIG. 3 is a sectional view taken along a longitudinal direction of the slide rail device of the vehicle seat according to the example embodiment of the invention.

The lower rail 40 is formed in a shape that extends in the vehicle longitudinal direction as shown in FIG. 2, and is arranged on the floor surface F. The lower rail 40 is integrally formed with a transverse sectional shape described next by bending a single flat plate-like member, which is made of ferrous material, in several locations as shown in FIG. 5. More specifically, the lower rail 40 has a lower surface portion 41 that has a flat plate shape provided substantially parallel to the floor surface F (FIG. 2), a right side surface portion 42R and a left side surface portion 42L, which have flat plate shapes that rise from the ends (i.e., one from each end) of the lower surface portion 41, a right upper surface portion 43R and a left upper surface portion 43L that have flat plate shapes bent back toward the inside from the upper ends of the right side surface portion 42R and the left side surface portion 42L, respectively, a right tip end portion 44R and a left tip end portion 44L that have flat plate shapes that hang straight down from the inside end portions of the right upper surface portion 43R and the left upper surface portion 43L, respectively, and a plurality of locking grooves 46 that are arranged adjacent to one another in the sliding direction, and that extend in the vertical direction, and are open on the end portion side as shown in FIGS. 2 and 3, formed in the right tip end portion 44R and the left tip end portion 44L.

Here, the lower surface portion 41 is one example of the "flat surface portion" of the invention. The right side surface portion 42R and the left side surface portion 42L are an example of the "pair of side surface portions" of the invention. The right tip end portion 44R and the left tip end portion 44L are both examples of the "tip end portion of the lower rail" as well as an example of the "pair of inside tip end portions".

The upper rail 20 is arranged on the seat main body 1 (see FIG. 1) as shown in FIG. 2, and is fitted into the lower rail 40 in a manner that enables it to slide in the rail longitudinal direction with respect to the lower rail 40. The upper rail 20 is integrally formed with a transverse sectional shape described next, by bending a single flat plate-like member, which is made of ferrous material, in several locations as shown in FIG. 5. More specifically, the upper rail 20 has an upper surface portion 21 that has a flat plate shape provided substantially parallel with the floor surface F, a right side surface portion 22R and a left side surface portion 22L, which have flat plate shapes that hang straight down from the ends (i.e., one from each end) of the upper surface portion 21, a right bent-back surface portion 23R and a left bent-back surface portion 23L that are bent back in a curved shape toward the outside from the lower ends of the right side surface portion 22R and the left side surface portion 22L, a right tip end portion 24R and a left tip end portion 24L that rise in a bent shape from the outside end portions of the right bent-back surface portion 23R and the left bent-back surface portion 23L, respectively, and notched portions 25 in which a portion is formed cutout corresponding to the locking grooves 46 of the lower rail 40 in the sliding direction as shown in FIGS. 2 and 3, on the right tip end portion 24R and the left tip end portion 24L of the upper rail 20.

Here, the upper surface portion 21 is one example of the "flat surface portion" of the invention. The right side surface portion 22R and the left side surface portion 22L are an example of the "pair of side surface portions" of the invention. The right tip end portion 24R and the left tip end portion 24L are both examples of the "tip end portion of the lower rail" as well as an example of the "pair of inside tip end portions".

Therefore, as shown in FIG. 5, when the lower rail 40 and the upper rail 20 are viewed at a cross-section orthogonal to the longitudinal direction thereof, an engaging portion 12 that inhibits the lower rail 40 and the upper rail 20 from separating, is formed by the upper rail 20 being arranged inserted in the lower rail 40, and the right tip end portion 44R and the left tip end portion 44L of the lower rail 40 overlapping with the right tip end portion 24R and the left tip end portion 24L of the upper rail 20 in a direction orthogonal to the longitudinal direction.

The slide locking mechanism 70 is a mechanism that is able to restrict sliding movement of the slide rails 11 at an appropriate position in the vehicle longitudinal direction as shown in FIG. 2. The slide locking mechanism 70 is mainly formed by a lock spring 80 (locking member, first urging member), and an operating member 90.

The lock spring 80 (locking member, first urging member) is a member that functions as both a locking member that places the upper rail 20 in a slide-locked state in which sliding movement of the upper rail 20 is restricted at an appropriate position with respect to the lower rail 40 by engaging with the locking grooves 46 and the notched portions 25, and a first urging member that elastically urges the upper rail 20 so as to maintain this slide-locked state. The lock spring 80 is formed by a linear member 89 that is made of metal and has a uniform cross-section. The lock spring 80 is formed by a generally U-shaped long member, by a first linear portion 81 arranged in a direction intersecting the slide rail 11, a second linear portion 82 that extends from both ends of the first linear portion 81 toward one side in the sliding direction of the slide rail 11, and a third linear portion 83, all being integrally connected as shown in FIGS. 2 and 3. The second linear portion 82 and the third linear portion 83 each have an elastically deformable portion 84 that is able to elastically deform in the vertical direction, provided in a longitudinally intermediate portion thereof. An engaging portion 85 that can engage and disengage with/from the locking grooves 46 and the notched portions 25 is formed on this elastically deformable portion 84. The engaging portion 85 is formed in a lattice shape that can receive the locking grooves 46 and the notched portions 25, by repeatedly bending the second linear portion 82 and the third linear portion 83 in a width direction (substantially parallel to the first linear portion 81) that intersects the sliding direction of the slide rail 11. The lock spring 80 has a spring hooking portion 82A formed on an end portion of the second linear portion 82, and a spring hooking portion 83A formed on an end portion of the third linear portion 83.

The lock spring 80 is housed in the slide rail 11 in an urging state, as shown in FIG. 3. More specifically, the upper rail 20 has a front supporting portion 26A and a rear supporting portion 26B formed by a portion of the right side surface portion 22R and a portion of the left side surface portion 22L being partially cut out and bent up. The spring hooking portion 82A and the spring hooking portion 83A of the lock spring 80 are retained from above by a retaining portion 92F of a lever member 92 that will be described later. Then, the second linear portion 82 and the third linear portion 83 between the elastically deformable portion 84 and the spring hooking portion 82A of the lock spring 80, and between the spring hooking portion 83A of the lock spring 80, respectively, are supported from below by the front supporting portion 26A. Then the first linear portion 81 of the lock spring 80 is supported from below by the rear supporting portion 26B.

Figure 4:
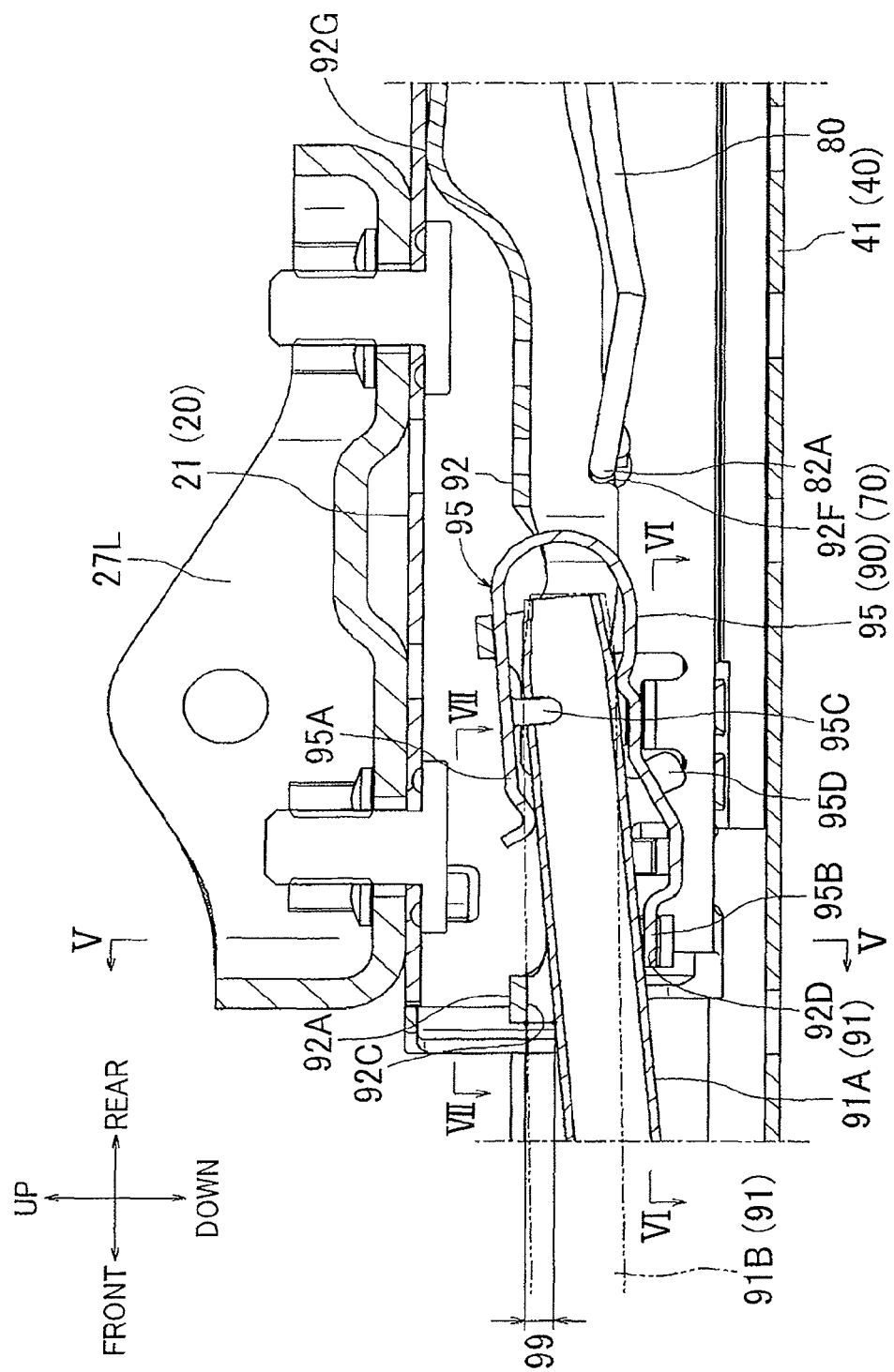
FIG. 4 is a partial sectional view of portion IV in FIG. 3.
Figure 6:
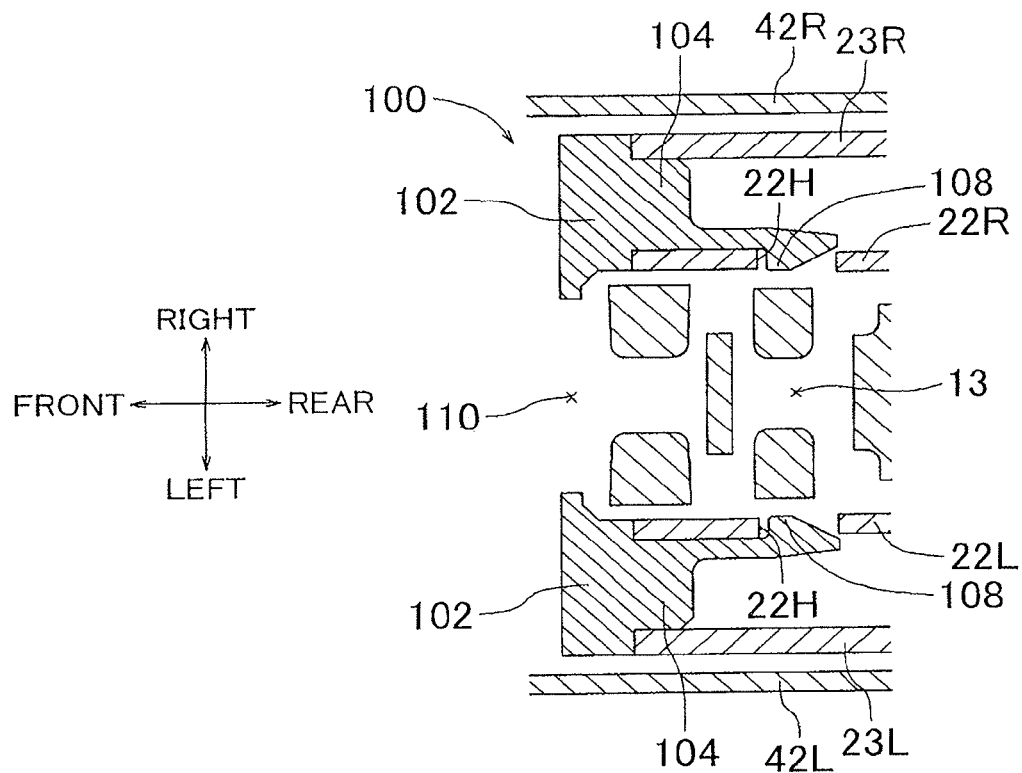
FIG. 6 is a sectional view at a position of line VI-VI in FIG. 4.
Figure 7:
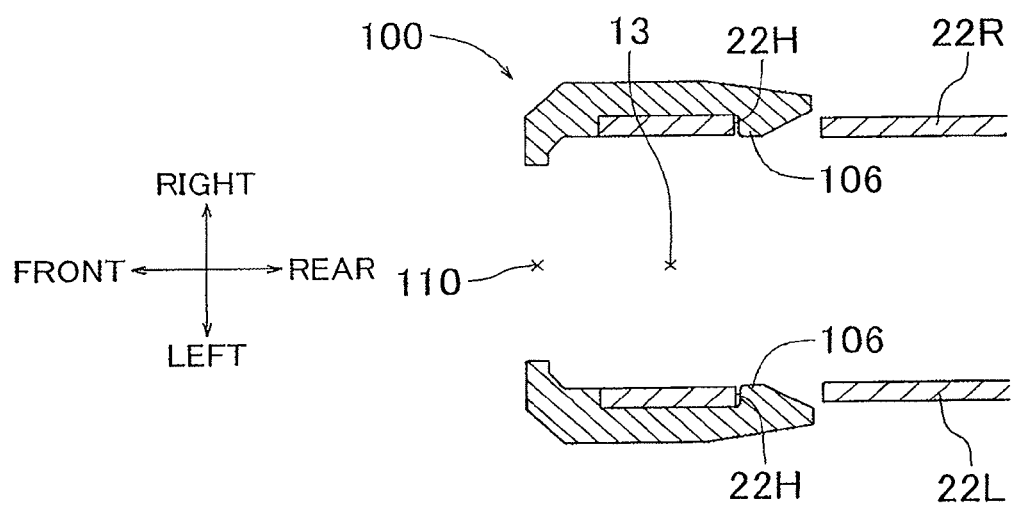
FIG. 7 is a sectional view at a position of line VII-VII in FIG. 4.
Figure 8:
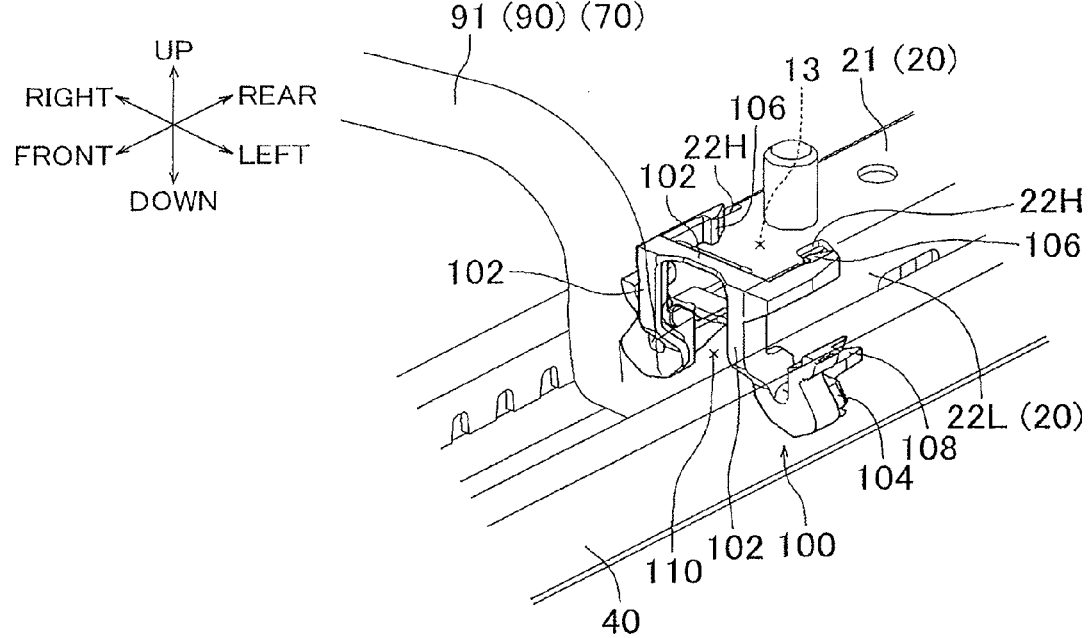
FIG. 8 is a partial sectional view of portion IV in FIG. 3.
Figure 9:
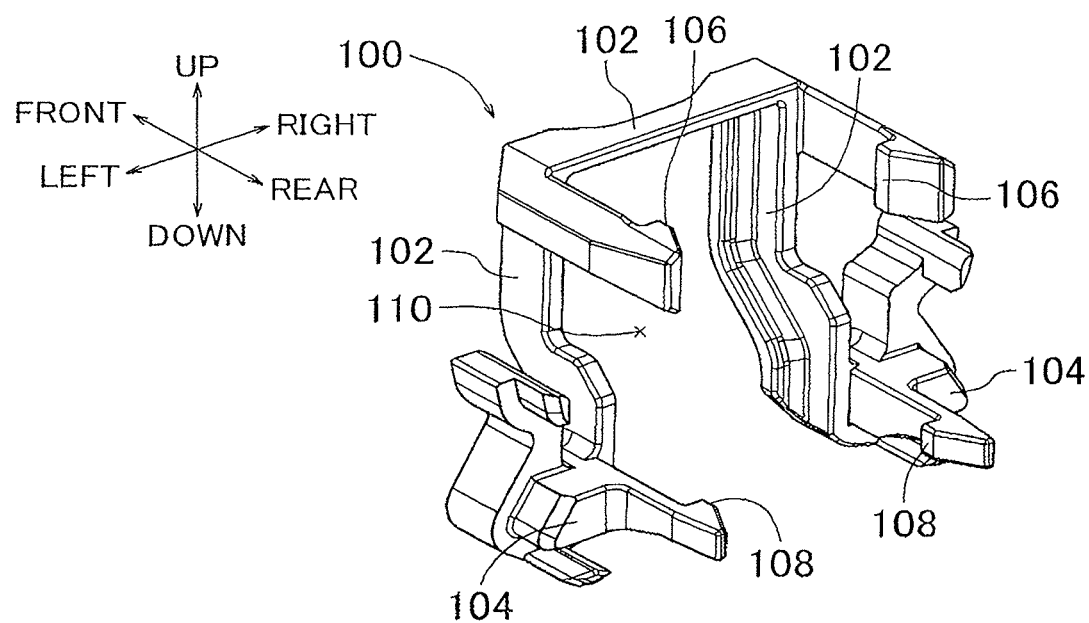
FIG. 9 is an overall perspective view of the cap attached to the slide rail device of the vehicle seat according to the example embodiment of the invention.

The operating member 90 is a member that transmits an unlocking force imparted by an operator in order to cancel the slide-locked state in which the lock spring 80, which is formed as a locking member as shown in FIGS. 2 and 3, is engaged with the locking grooves 46 and the notched portions 25, to the lock spring 80. The operating member 90 mainly includes a loop handle 91 (operation input member), a lever member 92 (operation output member), and a plate spring 95 (second urging member). The lever member 92 is a member that operates the engaging portion 85 so that it can engage and disengage with/from the locking grooves 46 and the notched portions 25, by pushing the elastically deformable portion 84 of the lock spring 80 that is housed in the slide rail 11 and elastically deforming it (i.e., the elastically deformable portion 84) in the vertical direction. The lever member 92 is formed as a long member by bending a metal plate-like member. The lever member 92 is housed in a space 13 between the upper surface portion 21 of the upper rail 20 and the lower surface portion 41 of the lower rail 40 as shown in FIGS. 3 and 5, and between the right side surface portion 22R and the left side surface portion 22L of the upper rail 20 (see FIG. 5). The loop handle 91 that will be described later is inserted as shown in FIGS. 3 and 4 on a front end 92A side of the lever member 92. A pushing portion 92E that pushes the elastically deformable portion 84 of the lock spring 80 as shown in FIG. 3, is formed on a rear end 92B side of the lever member 92. A fulcrum 92G in which a portion protrudes out and abuts against the upper surface portion 21 of the upper rail 20 is formed on an upper surface of the intermediate portion in the longitudinal direction of the lever member 92. A retaining portion 92F that retains the spring hooking portion 82A and the spring hooking portion 83A (see FIG. 2) of the lock spring 80 is formed between the front end 92A and the fulcrum 92G of the lever member 92. The loop handle 91 is formed by a metal rod-like member that has been appropriately bent and then inserted into the lever member 92 formed on the upper rail 20 of the left and right slide rails 11. The plate spring 95 is made of a metal plate-like member formed having a generally U-shaped cross-section as shown in FIGS. 2 to 4. The plate spring 95 is arranged on the front end 92A side of the lever member 92. An end portion of the loop handle 91 is inserted into the open end side of the plate spring 95. A protruding portion 95C is provided on one end 95A of the plate spring 95. This protruding portion 95C engages with an open portion 91C on an upper portion of the loop handle 91, thereby retaining the loop handle 91 so that it will not to slip out. Also, the one end 95A of the plate spring 95 is abutted against the loop handle 91, urging the loop handle 91 downward. A protruding portion 95D is provided on the other end 95B of the plate spring 95. This protruding portion 95D engages with a slit 92H on a portion of the lever member 92, thereby retaining this plate spring 95 so that it will not slip out of the lever member 92. When comparing the urging forces of the lock spring 80 and the plate spring 95, the urging force of the lock spring 80 is set larger. A stopper 92C against which an upper portion on an outer peripheral surface of the loop handle 91 abuts, and a stopper 92D against which a lower portion on the outer peripheral surface of the loop handle 91 abuts via the other end 95B of the plate spring 95, are provided on the front end 92A of the lever member 92. Therefore, by having the plate spring 95 be interposed, the loop handle 91 is attached so as to be able to rotate in the vehicle vertical direction with respect to the lever member 92, between an initial position 91A in which the loop handle 91 is abutted against the stopper 92D by the urging force of the plate spring 95, and a first operating position 91B in which the loop handle 91 is abutted against the stopper 92C against the urging force of the plate spring 95 by the operating force of the operator. The loop handle 91 is normally positioned in the initial position 91A shown in FIG. 4 by the urging force of the plate spring 95. The loop handle 91 has play 99 (clearance) between the stopper 92C of the lever member 92, and the upper portion of the outer peripheral surface of the loop handle 91 in this initial position 91A. Also, the loop handle 91 rotates in the clockwise direction in FIG. 4 until it abuts against the stopper 92C against the urging force of the plate spring 95, when operating force is exerted in a direction lifting the loop handle 91 up. When the loop handle 91 abuts against the stopper 92C of the lever member 92, it lifts the front end 92A side up. At this time, further urging force of the plate spring 95 is not applied while the loop handle 91 is abutting against the stopper 92C. In this state, the lever member 92 rotates around fulcrum 92G in the clockwise direction in FIG. 4, such that the pushing portion 92E (see FIG. 3) moves downward against the urging force of the lock spring 80. Then the lever member 92 pushes the elastically deformable portion 84 of the lock spring 80 so that it elastically deforms, and disengages the engaging portion 85 from the locking grooves 46 and the notched portions 25.

A link mechanism 50 is formed between the slide rail device 10 and the cushion frame 3f of the seat main body 1 of the vehicle seat, as shown in FIG. 1. This link mechanism 50 includes a front rod 51, a rear rod 52, front links 53R and 53L, and rear links 54R and 54L. The front links 53R and 53L that are made of plate members of ferrous material are integrally fixed to both ends (i.e., one to each end) of the front rod 51. Similarly, the rear links 54R and 54L that are made of plate members of ferrous material are integrally fixed to both ends (i.e., one to each end) of the rear rod 52. The front links 53R and 53L on both ends of the front rod 51 are pivotally attached via brackets 27R and 27L, respectively. Similarly, the rear links 54R and 54L on both ends of the rear rod 52 are pivotally attached via brackets 28R and 28L. The links of the link mechanism 50 are rotated by operation of the operating member 60.

The operating member 60 is arranged to the outside of the seat cushion 3 as shown in FIG. 1. The operating member 60 is formed with a pinion gear (not shown), an operating pivot member 62, a lifter lever 64, and a center gear (not shown) as its main components. The operating pivot member 62 and the lifter lever 64 of the operating member 60 are arranged to the outside of the lower arm 5, and the pinion gear and the center gear, neither of which are shown, are formed to the inside of the lower arm 5. The center gear is integrally fixed to the rear rod 52, and in mesh with the pinion gear. The pinion gear is connected to the operating pivot member 62 via a hole, not shown, provided in the lower arm 5, and this operating pivot member 62 is connected to the lifter lever 64.

When rotational operating force is exerted on the lifter lever 64, the pinion gear rotates and the rotational operating force is transmitted to the center gear, such that the rear rod 52 rotates. The rear link 54R and the rear link 54L pivot toward the front side in the FIG. 1 (i.e., in the counterclockwise direction in FIG. 1) around link pivoting shafts 29R and 29L of the brackets 28R and 28L with the rotation of the rear rod 52 in one direction. As a result, the seat main body 1 moves to a forward and upper position. When rotational operating force is exerted on the lifter lever 64 and the pinion gear rotates in reverse, the rear rod 52 rotates in the reverse direction. The rear link 54R and the rear link 54L pivot toward the rear side in the FIG. 1 (i.e., in the clockwise direction in FIG. 1) around the link pivoting shafts 29R and 29L of the brackets 28R and 28L with the rotation of the rear rod 52 in the other direction. As a result, the seat main body 1 moves to a rearward and lower position. When rotation operating force is not exerted on the lifter lever 64 of the operating member 60, braking force is applied by the operating pivot member 62, thus restricting rotation of the pinion gear. As a result, the rotation of the rear rod 52 is also restricted, so the vertical position of the seat main body 1 is maintained.

Caps 100 and 150, and 200 and 250 for protecting the end portions of the upper rail 20 and the lower rail 40 of the slide rails 11, as shown in FIG. 2, are provided on the upper rail 20 and the lower rail 40, respectively. These caps 100, 150, 200, and 250 are made of synthetic resin, and are fit into the rail end portions. Moreover, the caps 100 and 150 provided on the upper rail 20 each have a structure designed to inhibit deformation of the corresponding end portion.

The cap 100 is provided on a vehicle front side, of the end portions in the longitudinal direction of the upper rail 20, as shown in FIGS. 6 to 9. The cap 100 has a base portion 102 that is adjacent to, and following substantially the same shape as the end surface shape of, the end portion of the upper rail 20. A filler portion 104 that fills in a space in the separating direction of the lower rail 40 and the upper rail 20, in the engaging portion 12 is formed extending from the base portion 102 toward the center of the upper rail 20 in the longitudinal direction, on the cap 100 when viewed at a cross-section orthogonal to the longitudinal direction of the lower rail 40 and the upper rail 20. In the example embodiment, the separating direction is the vertical direction. This filler portion 104 is provided in a space corresponding to the right tip end portion 44R and the left tip end portion 44L (i.e., the pair of inside tip end portions), of the space in the separating direction of the lower rail 40 and the upper rail 20, in the engaging portion 12. More specifically, the filler portion 104 is formed in a shape that fills in the space between the right tip end portion 44R and the left tip end portion 44L of the lower rail 40, and the right bent-back surface portion 23R and the left bent-back surface portion 23L of the upper rail 20. The cap 100 has a pawl portion that is attached by engaging with a hole 22H provided in a side surface portion of the upper rail 20. The pawl portion has a pair of first pawl portions 106 provided on an upper side, and a pair of second pawl portions 108 provided on a lower side. The pair of first pawl portions 106 and the pair of second pawl portions 108 extend from the base portion 102 toward the center in the longitudinal direction of the upper rail 20. The first pawl portions 106 and the second pawl portions 108 of the cap 100 are structures that engage with the hole 22H on the side surface portion of the upper rail 20 from the outside. The base portion 102 of the cap 100 has an open portion 110 that allows the operating member 90 to enter the space 13 in the slide rail 11. The hole 22H that the first pawl portion 106 and the second pawl portion 108 are engaged with may also be provided in the upper surface portion 21 of the upper rail 20.

In this way, with the vehicle seat according to the example embodiment, the cap 100 has the base portion 102 that is adjacent to, and following substantially the same shape as the end surface shape of, the end portion of the upper rail 20 on which this cap 100 is provided. Therefore, the base portion 102 of the cap 100 is able to protect the end portion of the upper rail 20. Also, the cap 100 has the filler portion 104 that extends from the base portion 102 toward the center in the longitudinal direction of the upper rail 20 on which the cap 100 is provided, and that fills in the space in the separating direction of the lower rail 40 and the upper rail 20, in the engaging portion 12. Therefore, the filler portion 104 of the cap 100 inhibits rattling (i.e., relative movement in the vertical direction) of both members when a large load is exerted in a direction in which the lower rail 40 and the upper rail 20 separate from each other following a vehicle collision or the like, and thus enables the rigidity of the rail to be improved. This improvement in the rail rigidity makes it possible to inhibit deformation of the end portions of the lower rail 40 and the upper rail 20. Accordingly, it is possible to both protect, and inhibit the deformation of, the rail end portion of the lower rail 40 and the upper rail 20.

Also, the filler portion 104 is provided in the space corresponding to the right tip end portion 44R and the left tip end portion 44L (i.e., the pair of inside tip end portions), of the space in the separating direction of the lower rail 40 and the upper rail 20 in the engaging portion 12. This is because rattling of both members when a large load is exerted in a direction in which the lower rail 40 and the upper rail 20 separate from each other following a vehicle collision or the like, is pronounced at the right tip end portion 44R and the left tip end portion 44L described above. Therefore, it is possible to both further inhibit the deformation, and improve the rigidity, of the end portions of the lower rail 40 and the upper rail 20, by providing the filler portion 104 at this portion.

Also, the cap 100 is attached to the upper rail 20 by engaging with the first pawl portions 106 and the second pawl portions 108. The cap 100 does not have to be fixed (i.e., attached) by a fastening member or the like. Therefore, the cap 100 is able to both reduce the number of component parts, and improve the attaching workability.

Also, the first pawl portions 106 and the second pawl portions 108 for attaching the cap 100 are structures that engage with the hole 22H formed in at least one of the side surface portions of the upper rail 20 from the outside, so interference with the sliding movement of the lower rail 40 and the upper rail 20 is able to be inhibited.

Also, the lock spring 80 (a locking member) is arranged in the space formed between the lower surface portion 41 (a flat surface portion) of the lower rail 40 and the upper surface portion 21 (a flat surface portion) of the upper rail 20, and the operating member 90 is configured to enter from between the lower rail 40 and the upper rail 20 the end portion in the longitudinal direction of the lower rail 40 and the upper rail 20, and engage with the lock spring 80. In this way, the space around the slide rail 11 is able to be used effectively by having the slide locking mechanism 70 be arranged inside the slide rail 11. However, with this kind of structure, there is a possibility that the operating member 90 may interfere with the cap 100, because the operating member 90 enters between the lower rail 40 and the upper rail 20 from the end portion in the longitudinal direction of the slide rails 11. However, the base portion 102 of the cap 100 has the open portion 110 that allows the operating member 90 to enter between the lower rail 40 and the upper rail 20. Therefore, by providing the open portion 110 on the base portion 102 of the cap 100, even with a structure in which the operating member 90 that operates the lock spring 80 arranged inside the slide rail 11 enters between the lower rail 40 and the upper rail 20 from the end portion in the longitudinal direction of the slide rail 11, the rail end portion of the upper rail 20 is able to be both protected and inhibited from deforming.

Heretofore, an example embodiment of the invention has been described, but the vehicle seat of the invention is not limited to the example embodiment, and may be carried out in other various modes. For example, in the example embodiment, the cap is formed on the front end portion, but the cap is not limited to this. That is, the cap may also be formed on the rear end portion. Also, in the example embodiment, the filler portion of the cap is formed on the upper rail, but it may alternatively be formed on the lower rail. Also, the structures of the lower rail and the upper rail of the slide rail of the example embodiment are only examples. Any of a variety of rail structures may be applied as long as an engaging portion that inhibits separation between the lower rail and the upper rail is formed. For example, the structures of the lower rail and the upper rail of the example embodiment may be reversed. Also, the filler portion is described as being provided in a space corresponding to the right tip end portion and the left tip end portion (i.e., the pair of inside tip end portions) of the lower rail, of the space in the separating direction, but the filler portion is not limited to this. That is, the filler portion may be provided on any of various portions as long as they are portions that fill the space in the separating direction of both members, of the engaging portion that inhibits separation between the lower rail and the upper rail. Also, the cap is described as being made of synthetic resin, but the cap is not limited to this. That is, the cap may also be made of metal. Also, the example embodiment describes a vehicle seat that has a lift mechanism, but the vehicle seat is not limited to this. That is, the lift mechanism is not a necessary structure of the vehicle seat of the invention. That is, the structure may also be one in which the seat main body is connected to the upper rail via the bracket, without the lift mechanism.

What is claimed is:

1. A vehicle seat comprising:
   a slide rail including:
      a lower rail arranged on a vehicle structure member side, the lower rail including:
         a flat surface portion having a flat plate shape that is configured to be parallel to a vehicle structure member;
         a tip end portion; and
         an upper surface portion, and
      an upper rail that is arranged on a seat main body side and is slidably supported on the lower rail, the upper rail including:
         a flat surface portion having a flat plate shape that is configured to be parallel to the vehicle structure member;
         at least one side surface portion extending from the flat surface portion of the upper rail, the at least one side surface portion including a hole;
         a tip end portion; and
         a portion extending from the at least one side surface portion of the upper rail to the tip end portion of the upper rail,
   a cap that is provided on an end portion of the upper rail in a longitudinal direction of the upper rail, the cap including:
      a base portion that is adjacent to and follows an end surface shape of the end portion of the upper rail, the base portion including an open portion;
      a filler portion that extends in the longitudinal direction of the upper rail from the base portion toward a center of the upper rail; and
      at least one pawl portion attached to the at least one side surface portion of the upper rail by engagement with the hole provided in the at least one side surface portion of the upper rail from an outside of the upper rail to an inside of the upper rail; and
   a slide locking mechanism including:
      a locking member configured to place the upper rail in a slide-locked state that restricts a sliding movement of the upper rail with respect to the lower rail at a predetermined position; and
      an operating member configured to transmit an unlocking force to the locking member and release the upper rail from the slide-locked state established by the locking member, wherein
   when the upper rail is inserted into and arranged inside the lower rail, a separation between the lower rail and the upper rail is inhibited by the tip end portion of the lower rail, the upper surface portion of the lower rail, the at least one side surface portion of the upper rail, the tip end portion of the upper rail, and the portion extending from the at least one side surface portion of the upper rail to the tip end portion of the upper rail,
   a space is defined by the at least one side surface portion of the upper rail, the tip end portion of the upper rail, and the portion extending from the at least one side surface portion of the upper rail to the tip end portion of the upper rail, the filler portion of the cap extends below a lower side of the tip end portion of the lower rail, an entirety of the filler portion is disposed within the space, the locking member is arranged between the flat surface portion of the lower rail and the flat surface portion of the upper rail, the operating member is configured to engage with the locking member by entering between the lower rail and the upper rail from an end portion of the lower rail in a longitudinal direction of the lower rail and the end portion of the upper rail, and the open portion provided in the base portion of the cap allows the operating member to enter between the lower rail and the upper rail.

2. The vehicle seat according to claim 1, wherein the lower rail further includes side surface portions that extend from ends of the flat surface portion of the lower rail in a width direction of the flat surface portion of the lower rail, the at least one side surface portion of the upper rail is a first side surface portion of the upper rail, the upper rail further includes a second side surface portion, the first side surface portion extends from a first end of the flat surface portion in a width direction of the flat surface portion of the upper rail and the second side surface portion extends from a second end of the flat surface portion in the width direction of the flat surface portion of the upper rail, the upper surface portion of the lower rail is bent inward from an end portion of one of the side surface portions of the lower rail, the tip end portion of the lower rail extends toward an inside of the lower rail from the upper surface portion of the lower rail, the portion extending from the at least one side surface portion of the upper rail to the tip end portion of the upper rail is bent outward from the first side surface portion of the upper rail, the tip end portion of the upper rail extends toward the upper surface portion of the lower rail.

3. The vehicle seat according to claim 1, wherein the at least one side surface portion of the upper rail is a first side surface portion of the upper rail, the upper rail further includes a second side surface portion, and the base portion and the filler portion are arranged at an outer side of a space surrounded by the flat surface portion of the upper rail, the first side surface portion of the upper rail, and the second side surface portion of the upper rail.

4. The vehicle seat according to claim 1, wherein the at least one pawl portion is a first pawl portion of the cap, the cap further includes a second pawl portion, the first and second pawl portions are attached to the upper rail from the outside of the upper rail to the inside of the upper rail so as to avoid interference between the first and second pawl portions and the operating member.

5. The vehicle seat according to claim 1, wherein the portion extending from the at least one side surface portion of the upper rail to the tip end portion of the upper rail is a bent-back surface portion of the upper rail, and the bent-back surface portion of the upper rail extends from the at least one side surface portion in a lateral direction of the upper rail.

* * * * *